No. 609,509. Patented Aug. 23, 1898.
V. A. JENSEN.
MEANS FOR COUPLING SMALL PIPES.
(Application filed Nov. 23, 1897.)
(No Model.)
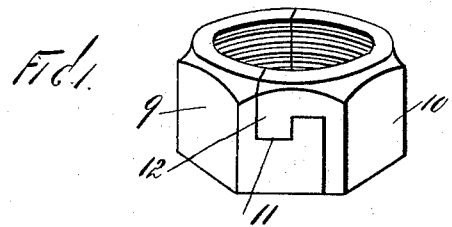
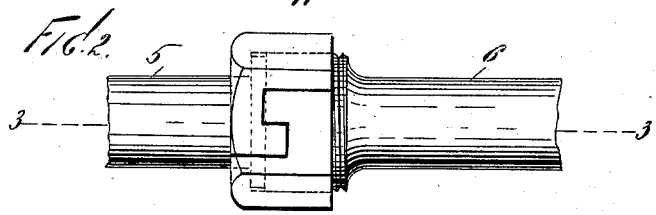
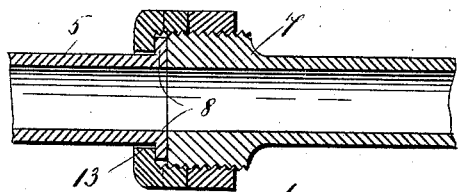
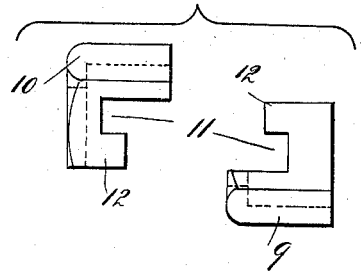
WITNESS
INVENTOR
Vilhelm A. Jensen
BY
Edgar Tate & Co
ATTORNEYS

UNITED STATES PATENT OFFICE.

VILHELM A. JENSEN, OF GLASGOW, SCOTLAND.

MEANS FOR COUPLING SMALL PIPES.

SPECIFICATION forming part of Letters Patent No. 609,509, dated August 23, 1898.

Application filed November 23, 1897. Serial No. 659,592. (No model.)

*To all whom it may concern:*

Be it known that I, VILHELM A. JENSEN, a subject of the King of Denmark, residing at Glasgow, in the county of Lanark, Scotland, have invented certain new and useful Improvements in Means for Coupling Small Pipes, of which the following is a full and complete specification, such as will enable those skilled in the art to which it appertains to make and use the same.

This invention relates to means for coupling small pipes; and the object thereof is to provide improved devices for this purpose whereby the abutting ends of pipes may be quickly and easily connected, the opposite ends of which are attached or connected so that a coupling-nut cannot be slipped thereover; and with this and other objects in view the invention consists in the construction, combination, and arrangement of parts hereinafter described and claimed.

The invention is fully disclosed in the following specification, of which the accompanying drawings form a part, in which the separate parts of my improvement are designated by the same numerals of reference in each of the views, and in which—

Figure 1 is a perspective view of a coupling-nut which I employ, said nut being composed of two parts; Fig. 2, a side view of the abutting ends of two parts or sections of pipes coupled according to my invention; Fig. 3, a longitudinal section on the line 3 3 of Fig. 2, and Fig. 4 a side view of the separate parts of my improved coupling-nut disconnected.

The usual method of connecting the ends of small pipes is by employing a coupling-nut; but through wear and tear and often through carelessness by not having the two parts of the pipe in a horizontal line when attempting to couple the same the threads on the nut are stripped off and a new nut is required, which in most cases necessitates the cutting off of the collar or flange at the end of one of the sections of the pipe, and after the new nut has been placed on said collar or flange must be brazed onto the end of the pipe from which it was cut, and this is a very difficult task, especially at sea, where many engineers have only a limited knowledge of the operation of brazing.

In the drawings forming part of this specification I have shown at 5 and 6 the abutting ends of two pipes, and one of these pipes is provided with a cylindrical screw-threaded head 7 and the other with a collar or flange 8, and in the practice of my invention I provide a coupling-nut which consists of two parts 9 and 10, and these parts are similar in form, and each is also semicircular in cross-section, and each is provided with a transverse groove 11 and with interlocking shoulders or projections 12, and said parts are adapted to be put together as shown in Fig. 1, and when thus placed together they form a complete nut. It will be understood that the separate parts of this nut may be placed on the pipe 5 and interlocked, as clearly shown in Fig. 2, and then screwed onto the screw-threaded head 7, so as to clamp the two pipes together, said nut being provided with an annular inwardly-directed flange or rim 13, which is partly on one of the parts thereof and partly on the other and which operates in connection with the flange, rim, or collar 8. When the separate parts of the nut have been placed on the pipe and connected as described, it may be screwed into position, as clearly shown in Figs. 2 and 3, and said nut may also be screwed off of the coupling-head 7 whenever desired and the separate parts thereof be disconnected and removed from the pipe when necessary.

It will be understood that the separate parts of the nut are locked together as soon as the nut begins to pass onto the cylindrical head 7, the threads on said head and on the interior of the separate parts of the nut operating to produce this result, and if at any time the threads in the nut become destroyed a new nut may be placed upon the pipe without cutting off the flange, rim, or collar 8 on the section 5 thereof.

It will thus be seen that I accomplish the object of my invention by means of a simple and effective construction, and my improvement may be used wherever couplings of this class are required.

Having fully described my invention, I claim as new and desire to secure by Letters Patent—

1. The herein-described means for coupling pipes, said means consisting of a nut composed of two parts which are adapted to be interlocked, and said nut being also provided at one end with an inwardly-directed flange or rim, substantially as shown and described.

2. A nut for use in coupling pipes, said nut being composed of two parts which are adapted to be interlocked, and said nut being also provided at one end with an inwardly-directed flange or rim, substantially as shown and described.

3. The combination with two pipes, one of which is provided at one end with a cylindrical screw-threaded head, and the other with a flange, rim or collar, of a coupling-nut which is composed of two interlocking parts, said nut being provided at one end with an inwardly-directed flange or rim, substantially as shown and described.

In testimony that I claim the foregoing as my invention I have signed my name, in presence of the subscribing witnesses, this 22d day of November, 1897.

VILHELM A. JENSEN.

Witnesses:
L. M. MULLER,
M. A. KNOWLES.